US006801942B1

(12) United States Patent
Dietrich et al.

(10) Patent No.: US 6,801,942 B1
(45) Date of Patent: Oct. 5, 2004

(54) APPARATUS, METHOD AND SYSTEM FOR REMOTELY ACCESSING AND/OR CONTROLLING CAN NODE ARRANGEMENTS, INCLUDING VEHICLE ELECTRONIC CONTROL UNITS, DURING VEHICLE OPERATION

(75) Inventors: Arne Dietrich, Mountavin View, CA (US); Markus Klausner, Wexford, PA (US); Bernhard Seubert, Schwieberdingen (DE); Alexander Springer, Erligheim (DE)

(73) Assignee: Robert Bosch GmbH, Stuttgart (DE)

( * ) Notice: Subject to any disclaimer, the term of this patent is extended or adjusted under 35 U.S.C. 154(b) by 821 days.

(21) Appl. No.: 09/663,210

(22) Filed: Sep. 15, 2000

(51) Int. Cl.$^7$ .......................................... G06F 15/173
(52) U.S. Cl. ..................................... 709/225; 709/217
(58) Field of Search ............................... 709/201–253

(56) References Cited

U.S. PATENT DOCUMENTS

| 5,126,941 A | * | 6/1992 | Gurmu et al. ................. 701/24 |
| 5,155,689 A | * | 10/1992 | Wortham .................. 455/456.3 |
| 5,420,794 A | * | 5/1995 | James ........................ 701/117 |
| 5,867,089 A | * | 2/1999 | Zyburt et al. ........... 340/323 R |

FOREIGN PATENT DOCUMENTS

| WO | WO 97 31454 | 8/1997 |
| WO | WO 99 22301 | 5/1999 |

OTHER PUBLICATIONS

Ekiz et al, "Performance Analysis of a Can/Can Bridge," Proceedings of the Int't. Conf. on Network Protocols, XX, XX, Oct. 29, 1996, pp. 181–188.

Gupta S., "Can Facilitates in–Vehicle Networking," SAE Special Publications, XX, XX, No. 806, Feb. 26, 1990, pp. 9–16.

* cited by examiner

Primary Examiner—David Wiley
Assistant Examiner—Scott M. Collins
(74) Attorney, Agent, or Firm—Kenyon & Kenyon

(57) ABSTRACT

A method for remotely accessing at least one of at least one CAN node arrangement of a CAN bus arrangement associated with the vehicle during vehicle operation, the CAN bus arrangement being associated with a CAN gateway arrangement for coupling to an external network, inn which the method includes the steps of communicating an initialization control message from the CAN gateway arrangement to the at least one CAN node arrangement using the CAN bus arrangement, the initialization control message including a CAN node arrangement identifier code, comparing the CAN node arrangement identifier code with a unique CAN node arrangement identifier code stored at each of the at least one CAN node arrangement for determining a selected CAN node arrangement based on the CAN node arrangement identifier code and the unique CAN node arrangement identifier code, processing the initialization control message using the selected CAN node arrangement, communicating a data addressing message from the CAN gateway arrangement to the selected CAN node arrangement, the data addressing message including at least one memory address of the data to be at least one of accessed, controlled and retrieved, communicating at least one data reply message from the selected CAN node arrangement to the CAN gateway arrangement, in which the at least one data reply message includes a data payload, incorporating at least the data payload of the at least one data reply message using a communication protocol of the external network for communication of the data payload to the remote accessing arrangement, and communicating an end control message from the CAN gateway arrangement to the selected CAN node arrangement using the CAN bus arrangement.

40 Claims, 3 Drawing Sheets

APPARATUS, METHOD AND SYSTEM FOR REMOTELY ACCESSING AND/OR CONTROLLING CAN NODE ARRANGEMENTS, INCLUDING VEHICLE ELECTRONIC CONTROL UNITS, DURING VEHICLE OPERATION

FIELD OF THE INVENTION

The present invention concerns an apparatus, method and system for remotely and wirelessly accessing and/or controlling vehicle-based controller area network (CAN) based node arrangements, including accessing and/or controlling data available in a memory of a vehicle-based electronic control unit (ECU), obtaining a memory dump of such a memory, remotely controlling a selected CAN node arrangement, such as, for example, a vehicle ECU, and monitoring in essentially real-time internal conditions and states of a selected CAN node arrangement, such as, for example, a vehicle ECU, during vehicle operation.

BACKGROUND INFORMATION

While remote access may be obtainable with respect to certain defined "external" signals communicated from a CAN node arrangement and/or vehicle ECU on a controller area network (CAN) bus, it is not believed that this provides any of the following capabilities: remotely accessing and/or controlling internal states of a CAN node arrangement and/or vehicle ECU (that is, "internal" signals not otherwise communicated on the CAN bus, as opposed to "external" signals normally output for communication on a CAN bus); obtaining a memory dump of such a memory, and controlling a CAN node arrangement and/or vehicle ECU and/or vehicle subsystem from outside the vehicle while the vehicle is operating in the field.

SUMMARY OF THE INVENTION

An object of an exemplary method according to the present invention is directed to providing a method for remotely accessing at least one CAN node arrangement of a CAN bus arrangement associated with the vehicle during vehicle operation, the CAN bus arrangement being associated with a CAN gateway arrangement for coupling to an external network, the method including the steps of: communicating an initialization control message from the CAN gateway arrangement to the at least one CAN node arrangement using the CAN bus arrangement, the initialization control message including a CAN node arrangement identifier code; comparing the CAN node arrangement identifier code with a unique CAN node arrangement identifier code stored at each of the at least one CAN node arrangement for determining a selected CAN node arrangement based on the CAN node arrangement identifier code and the unique CAN node arrangement identifier code; processing the initialization control message using the selected CAN node arrangement; communicating a data addressing message from the CAN gateway arrangement to the selected CAN node arrangement, the data addressing message including at least one memory address of the data to be at least one of accessed, controlled and retrieved; communicating at least one data reply message from the selected CAN node arrangement to the CAN gateway arrangement, wherein the at least one data reply message includes a data payload; incorporating at least the data payload of the at least one data reply message using a communication protocol of the external network for communication of the data payload to the remote accessing arrangement; and communicating an end control message from the CAN gateway arrangement to the selected CAN node arrangement using the CAN bus arrangement.

Another object of an exemplary method according to the present invention is directed to providing the above method, further including the step of establishing a wireless communication link between a remote accessing and control arrangement and the CAN gateway arrangement.

Still another object of an exemplary method according to the present invention is directed to providing the above method, in which the step of establishing the wireless communication is performed using a data call based on a point-to-point protocol.

Yet another object of an exemplary method according to the present invention is directed to providing the above method, in which the remote accessing and control arrangement includes a computer arrangement.

Still another object of an exemplary method according to the present invention is directed to providing the above method, in which the remote accessing and control arrangement includes a wireless communication arrangement.

Yet another object of an exemplary method according to the present invention is directed to providing the above method, in which the remote accessing and control arrangement includes a computer arrangement and a wireless communication arrangement.

Still another object of an exemplary method according to the present invention is directed to providing the above method, in which the external network includes the Internet.

Yet another object of an exemplary method according to the present invention is directed to providing the above method, in which: the communication protocol includes at least one of a transmission control protocol and an Internet protocol; and the remote accessing and control arrangement and the CAN gateway node arrangement are identified by associated addresses based on the Internet protocol.

Still another object of an exemplary method according to the present invention is directed to providing the above method, in which the CAN gateway arrangement includes: a processor arrangement for communicating with the CAN node arrangement using the CAN bus arrangement; and a wireless communication arrangement for communications with a remote accessing and control arrangement.

Yet another object of an exemplary method according to the present invention is directed to providing the above method, in which the CAN bus arrangement includes: at least two CAN buses; and at least one CAN/CAN gateway arrangement for coupling the at least two CAN buses.

Still another object of an exemplary method according to the present invention is directed to providing the above method, in which the at least one CAN node arrangement includes at least one of an electronic control unit, a sensor arrangement and a control module for use in the vehicle.

Yet another object of an exemplary method according to the present invention is directed to providing the above method, in which the initialization control message includes a data defining payload for defining the data to be one of accessed, controlled and retrieved from the selected CAN node arrangement.

Still another object of an exemplary method according to the present invention is directed to providing the above method, in which: the remote accessing and control arrangement communicates control information using a transmission control protocol; and the control information corresponds to at least the initialization control message, the data addressing message, the data reply message and the end control message for causing the CAN gateway arrangement to communicate at least the initialization control message, the data addressing message, the data reply message and the end control message on the CAN bus arrangement.

Yet another object of an exemplary method according to the present invention is directed to providing the above method, in which the CAN node arrangement identifier code for determining the selected CAN node arrangement is determined by a program of the remote accessing and control arrangement.

Still another object of an exemplary method according to the present invention is directed to providing the above method, in which the CAN gateway arrangement stores a set of CAN gateway message identifiers for providing CAN gateway communications on the CAN bus arrangement.

Yet another object of an exemplary method according to the present invention is directed to providing the above method, in which the CAN gateway arrangement stores at least one of a message time period and a debounce time period.

Still another object of an exemplary method according to the present invention is directed to providing the above method, in which the CAN gateway arrangement stores unique CAN node arrangement identifier codes for each of the at least one CAN node arrangement.

Yet another object of an exemplary method according to the present invention is directed to providing the above method, in which: the unique CAN node arrangement identifier codes differ from corresponding addresses used by a program of a remote accessing and control arrangement; and the CAN gateway arrangement includes a lookup table for matching each of the unique CAN node arrangement identifier codes and the corresponding addresses from the remote accessing and control arrangement.

Still another object of an exemplary method according to the present invention is directed to providing the above method, in which the data addressing message includes information for at least one of accessing, controlling and retrieving at least one of a single word, two words and a plurality of words within an address range.

Yet another object of an exemplary method according to the present invention is directed to providing the above method, in which the plurality of words within the address range are communicated in a set of multiplexed data reply messages.

Still another object of an exemplary method according to the present invention is directed to providing the above method, in which at least one of a selected electronic control unit and the selected CAN node arrangement replies to the data addressing message with the at least one data reply message.

Yet another object of an exemplary method according to the present invention is directed to providing the above method, in which: data reply message identifiers differ from initialization control message identifiers and data addressing message identifiers; and the data reply messages are communicated periodically by one of using a same data reply message identifier for a multiplexed payload and using a changing data reply message identifier.

Still another object of an exemplary method according to the present invention is directed to providing the above method, in which: at least one of a selected electronic control unit and the selected CAN node arrangement is monitored essentially in real-time by periodically retrieving at least one word; and payload information of each of the data reply messages is transmitted by the CAN gateway arrangement without delay on the external network.

Yet another object of an exemplary method according to the present invention is directed to providing the above method, in which the payload information includes internal signal information from a memory of the selected electronic control unit.

Still another object of an exemplary method according to the present invention is directed to providing the above method, in which at least one of multiple word retrieval and a memory dump is provided by buffering payload information of the data reply messages and concatenated into a transmission communication protocol information stream.

Yet another object of an exemplary method according to the present invention is directed to providing the above method, in which the data addressing message and a control message are included in one message for communication on the CAN bus arrangement.

Another object of an exemplary system according to the present invention is directed to providing a system for remotely accessing at least one CAN node arrangement during vehicle operation, the system including: a CAN bus arrangement for use in a vehicle, the at least one CAN bus including the at least one CAN node arrangement; a wireless communication arrangement for coupling with an external network; a CAN gateway arrangement for coupling with the remote network arrangement, the CAN gateway arrangement being coupled to the wireless communication arrangement; another wireless communication arrangement; a remote accessing and control arrangement for at least one of remotely accessing and remotely controlling at least one of the at least one CAN node arrangement through the CAN bus arrangement, the remote accessing and control arrangement being coupled to the another wireless arrangement and being configured for communicating between the another wireless communication arrangement and the wireless communication arrangement of the CAN gateway arrangement.

Still another object of an exemplary system according to the present invention is directed to providing the above system, in which the CAN gateway arrangement includes a processor for performing the following steps: communicating an initialization control message from the CAN gateway arrangement to the at least one CAN node arrangement using the CAN bus arrangement, the initialization control message including a CAN node arrangement identifier code; comparing the CAN node arrangement identifier code with a unique CAN node arrangement identifier code stored at each of the at least one CAN node arrangement for determining a selected CAN node arrangement based on the CAN node arrangement identifier code and the unique CAN node arrangement identifier code; processing the initialization control message using the selected CAN node arrangement; communicating a data addressing message from the CAN gateway arrangement to the selected CAN node arrangement, the data addressing message including at least one memory address of the data to be at least one of accessed, controlled and retrieved; communicating at least one data reply message from the selected CAN node arrangement to the CAN gateway arrangement, wherein the at least one data reply message includes a data payload; incorporating at least the data payload of the at least one data reply message using a communication protocol of the external network for communication of the data payload to the remote accessing arrangement; and communicating an end control message from the CAN gateway arrangement to the selected CAN node arrangement using the CAN bus arrangement.

Yet another object of an exemplary system according to the present invention is directed to providing the above system, in which the data addressing message and a control message are included in one message for communication on the CAN bus arrangement.

Another object of an exemplary CAN gateway arrangement according to the present invention is directed to providing a CAN gateway arrangement for accessing at least one CAN node arrangement of a CAN bus arrangement associated with the vehicle during vehicle operation, the CAN bus arrangement being linkable to the CAN gateway arrangement for coupling to an external network, the CAN gateway arrangement including a processor arrangement for performing the following steps: communicating an initialization control message from the CAN gateway arrangement to the at least one CAN node arrangement using the CAN bus arrangement, the initialization control message including a CAN node arrangement identifier code; comparing the CAN node arrangement identifier code with a unique CAN node arrangement identifier code stored at each of the at least one CAN node arrangement for determining a selected CAN node arrangement based on the CAN node arrangement identifier code and the unique CAN node arrangement identifier code; processing the initialization control message using the selected CAN node arrangement; communicating a data addressing message from the CAN gateway arrangement to the selected CAN node arrangement, the data addressing message including at least one memory address of the data to be at least one of accessed, controlled and retrieved; communicating at least one data reply message from the selected CAN node arrangement to the CAN gateway arrangement, wherein the at least one data reply message includes a data payload; incorporating at least the data payload of the at least one data reply message using a communication protocol of the external network for communication of the data payload to the remote accessing arrangement; and communicating an end control message from the CAN gateway arrangement to the selected CAN node arrangement using the CAN bus arrangement.

Still another object of an exemplary CAN gateway arrangement according to the present invention is directed to providing the above arrangement, in which the CAN gateway arrangement further includes a wireless communications arrangement for communicating with the external network.

Yet another object of an exemplary CAN gateway arrangement according to the present invention is directed to providing the above arrangement, in which the CAN gateway arrangement further includes the wireless communications arrangement includes at least one of a modem and a cellular phone.

Still another object of an exemplary CAN gateway arrangement according to the present invention is directed to providing the above arrangement, in which the data addressing message and a control message are included in one message for communication on the CAN bus arrangement.

DETAILED DESCRIPTION

Figure 1:
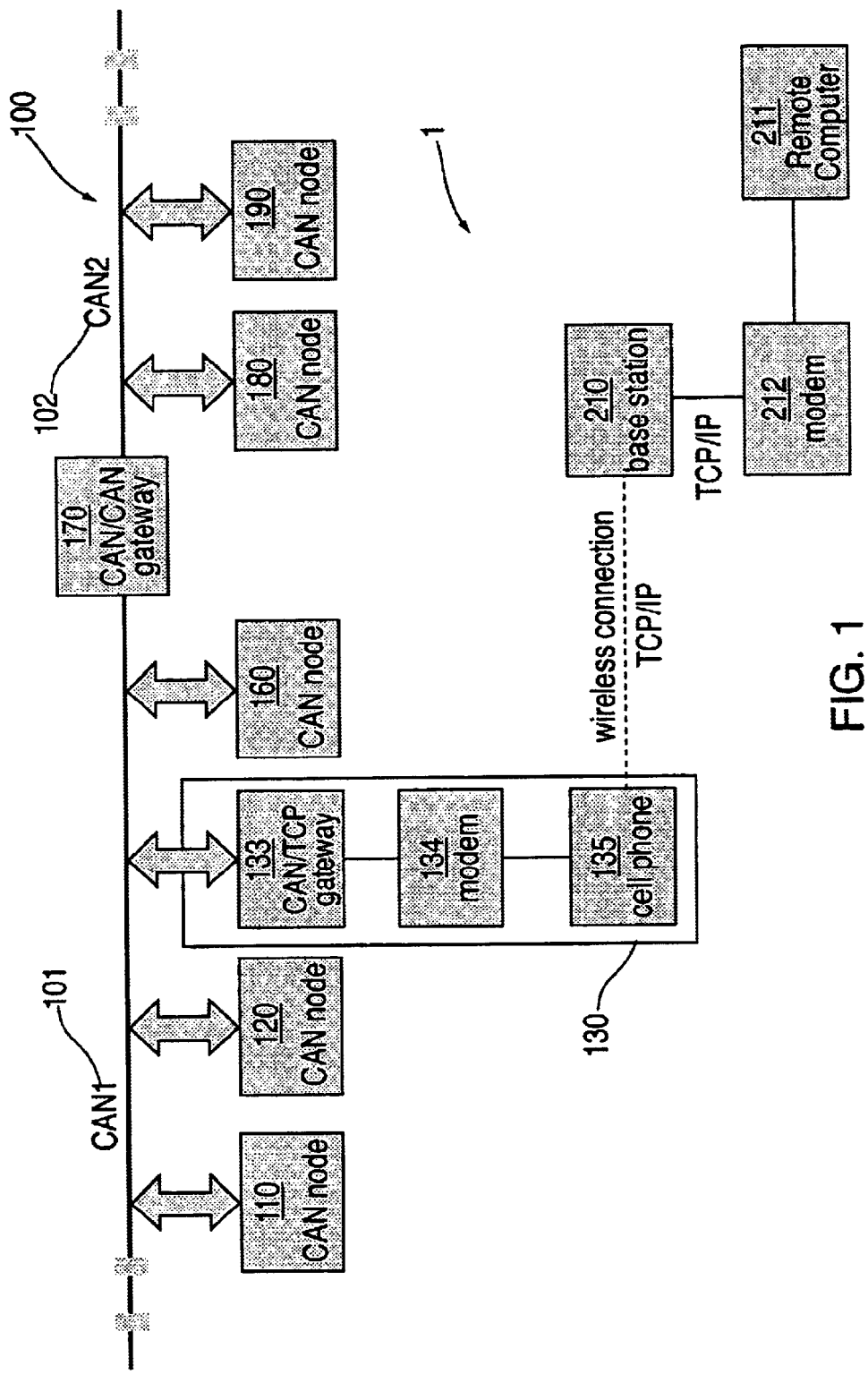
FIG. 1 shows an exemplary embodiment of a system according to the present invention, including a portion of an exemplary embedded controller area network for use in a vehicle.
Figure 2:
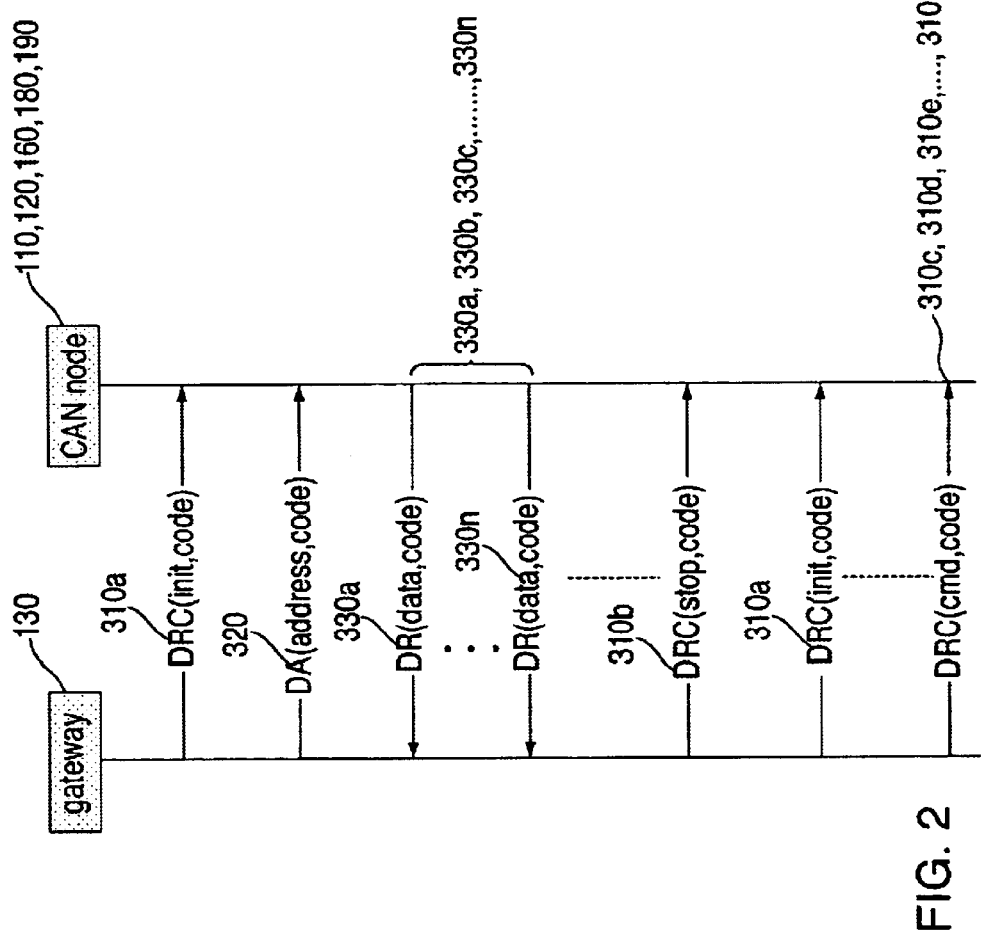
FIG. 2 shows communication messages between a CAN gateway arrangement, including a CAN/TCP gateway arrangement, and a selected or target CAN node arrangement and/or an associated vehicle ECU.

In FIG. 1, the remote access and control system 1 includes a CAN gateway arrangement 130, which includes a CAN/TCP gateway arrangement 133, for use with a CAN bus/network arrangement 100 in a vehicle. The CAN gateway arrangement 130 uses a processor arrangement and a method for use in remotely accessing, controlling and/or retrieving data in or from a memory, such as, for example, a random-access-memory (RAM), of one or more of the CAN node arrangements 110, 120, 160, 180 and 190 in the CAN bus/network arrangement 100. In particular, FIG. 1 shows a portion of an exemplary embedded controller area network arrangement 100, including the CAN node arrangements 110, 120, 160, 180, and 190, as well as the CAN/TCP gateway arrangement 133, that are connected or otherwise coupled to two CAN buses, namely CAN1 bus 101 and CAN2 bus 102, which may be connected or coupled together by a CAN/CAN gateway arrangement 170. The CAN1 bus 101 may include, for example, a powertrain CAN bus arrangement, and the CAN2 bus 102 may include, for example, a vehicle body electronics CAN bus arrangement. The CAN node arrangements 110, 120 and 160 may respectively include, for example, vehicle electronic control units for providing engine control, transmission control and vehicle stability control. Also, for example, the CAN node arrangement 160 may include a steering angle sensor, the CAN node arrangement 180 may include a door lock control module and the CAN node arrangement 190 may include a window lifter module. As used herein, an electronic control unit is a form of a CAN node arrangement.

In the exemplary embodiment of FIG. 1, the CAN node arrangement 130 includes a modem 134, a cellular (cell) phone 135, and a CAN/TCP gateway arrangement 133 (which is a CAN node arrangement), all of which may be integrated on a common substrate. A remote accessing and/or control arrangement 211, which may include a computer, is communicatively linkable to the CAN node arrangement 130 using wireless communications and a transmission control protocol (TCP) and Internet protocol (IP), or any other suitably appropriate transmission protocol. The cell phone 135 may include a cellular communication chipset for communicating in a cellular network, such as, for example, GSM or CDMA, or, alternatively, it may include a satellite communication chipset for communicating with communication satellites. The base station or coupling arrangement 210 is used to communicatively link with the cell phone 135. The communication linking arrangement 212 may include, for example, a dial-up server and an associated local area network (LAN), another cell phone and modem or a wire-line modem (as shown in FIG. 1) for communicatively linking the remote accessing and/or control arrangement 211.

The remote accessing and/or control arrangement 211 (which may include, for example, a computer as shown in FIG. 1) and the communications linking arrangement 212 (which may include, for example, a modem as shown in FIG. 1) may be located in other vehicle. In this way, vehicle-to-vehicle communications may be provided based on the gateway protocol described herein.

As described above, the CAN/TCP gateway arrangement 133, the modem 134 and the cell phone 135 may be integrated in a single housing, including, for example, a single chip. Alternatively, these CAN gateway components may be connected and/or coupled by a digital signal line, an optical link and/or a wireless link. The CAN node includes a suitably appropriate processor arrangement, which may be, for example, a microprocessor, a microcontroller or an ASIC-based processor arrangement, and provides a gateway from the CAN bus arrangement 100 to a wireless TCP/IP link between the cell phone 135 and the base station 210. The CAN gateway arrangement 130, including the CAN/TCP gateway or node arrangement 133, may include an existing vehicle ECU, such as, for example, an engine controller, that uses additional software to implement the CAN/TCP gateway operating feature, or it may be a dedicated CAN gateway arrangement. A TCP/IP stack may be implemented using the processor arrangement of the CAN/TCP gateway arrangement 133 of the CAN node arrangement 130. The CAN node arrangement 130 may communicate with the remote accessing and/or control arrangement 211 using the TCP/IP wireless link. By using TCP/IP with the wireless link through the cell phone 135, the CAN gateway arrangement 130 may be used to globally access and/or control one or more of the CAN node arrangements and/or associated vehicle ECUs.

To access, control and/or retrieve data from the CAN node arrangements 110, 120, 160, 180 and 190 while the vehicle is operating, a CAN gateway communication protocol is provided on top of or in addition to the normal or extended CAN protocols, which are readily available and which are hereby incorporated by reference. As discussed herein, while the CAN node arrangements 110, 120, 160, 180 and 190 may include vehicle electronic control units (ECUs), the exemplary apparatus, method and system, however, applies to any suitably appropriate CAN node arrangement, such as, for example, vehicle sensors and/or control modules. The exemplary CAN "gateway" communication protocol. as described herein, includes lower priority identifiers than do other CAN messages for the normal or extended CAN protocols, and is defined as follows:

A "Data Retrieval Control" or DRC message 310, includes a payload that may be determined by a program, including, for example, an application program, of the remote accessing and/or control arrangement 211. The payload defines the data to be retrieved and the CAN node arrangement and/or vehicle ECU from which the data are to be accessed, controlled and/or retrieved. In particular, the DRC message 310 may include a command specifying the class or type of data to be retrieved, and at least, for example, one bit for implementing at least an "initiate data retrieval" state and a "stop data retrieval" state. Additional bits may be used to provide further access and/or control over the selected CAN node arrangement and/or vehicle ECU. In addition, the DRC message 310 includes a code for selecting a specific or target CAN node arrangement and/or vehicle ECU. Thus, for example, a first byte of the DRC message 310 may include a vehicle ECU identifying code, and a second byte may include the data access, control and/or retrieval command. Of course, any other suitably appropriate message syntax may be used.

A "Data Address" or DA message 320 describes an address(es) or address(es) range of the data to be accessed, controlled and/or retrieved from the selected CAN node arrangement and/or vehicle ECU. The DA message 320 includes a word location in memory, and a bit pattern for indicating whether to access, control and/or retrieve a single word or a plurality of words between two addresses. In an exemplary embodiment, the bit pattern may be coded in the first two data bits of the CAN message. In another exemplary embodiment, the bit pattern may be replaced, for example, by a byte containing the number of words to be retrieved after the word location provided by the DA message 320. If appropriate or desired, the DA message 320 may be included in the DRC message 310. This provides a minimal communication method using at least two messages, namely one message specifying the address(es) from which the data is to be accessed, controlled and/or retrieved and a data reply message (as described herein) that may include the information selected from a memory of a CAN node arrangement.

A "Data Retrieval" or DR data and/or reply message 330 includes a number of bits for an identifier code identifying a selected CAN node arrangement and/or vehicle ECU from which the data may be accessed, controlled and/or retrieved. Thus, for example, the first byte of the DR data and/or reply message 330 may include the identifier code, and the remainder of the DR data and/or reply message 330 may include the requested word payload. In this regard, for example, if the identifier code occupies one byte, seven bytes may remain for the memory content to be retrieved for an eight-byte data scheme. Thus, for a word size of sixteen (16) bits, three (3) words may be assigned to each DR data and/or reply message 330. If, for example, words from an address range, such as an entire vehicle ECU memory are to be retrieved, the accessed CAN node arrangement may provide a set of periodic DR data and/or reply messages 330a, 330b, 330c, . . . , 330n.

To access, control and/or retrieve data from the CAN node arrangements and/or associated vehicle ECUs (based on the exemplary communication method between the CAN gateway arrangement 130 and a selected CAN node arrangement and/or vehicle ECU as shown in the Figures) a TCP communication link between the remote accessing and/or control arrangement 211 and the CAN gateway arrangement 130 is established using the modem 134 and the data call between the remote accessing and/or control arrangement 211 (using the modem or other communication linking arrangement 212) and the CAN gateway arrangement 130 (using the modem 134 and the cell phone 135). The remote accessing and/or control arrangement 211 and the CAN gateway node arrangement 130 may be identified by their IP addresses, and the data call may be based on the point-to-point protocol (PPP).

Next, the remote accessing and/or control arrangement 211 communicates a central command using the TCP link to the CAN gateway arrangement 130 in the vehicle for sending a DRC initialization message 310a on the CAN bus arrangement 100 to a selected CAN node arrangement and/or vehicle ECU, which, as discussed herein, is selected by, for example, the application program of the remote accessing and/or control arrangement 211. The CAN gateway arrangement 130 stores a set of CAN gateway message/protocol identifiers that the CAN gateway arrangement 130 may communicate or transmit on the CAN bus arrangement 100, together with a corresponding message period/time or debounce period/time (that may correspond, for example, to a minimum delay until the next message with the same identifier may be sent). Also, the CAN gateway node arrangement 130 stores a unique identifier code for each CAN node arrangement and/or vehicle ECU. This unique identifier code may be different from the addressing code used by the application program (whether software, hardware or some other comparable arrangement) of the remote accessing and/or control arrangement 211. If different, the gateway node arrangement 130 may include, for example, a stored lookup table for matching the addressing or external identifier code communicated from the remote accessing and/or control arrangement 211 with the identifier code from the CAN node arrangement and/or vehicle ECU.

Next, the CAN gateway arrangement 130 communicates or transmits the DRC initialization message 310a on the CAN bus arrangement 100. Since each CAN node arrangement and/or vehicle ECU stores a unique code, each of the CAN node arrangements and/or vehicle ECUs read the "broadcast" DRC initialization control message 310a and compares the selected identifier code in the DRC control message 310 with their respective unique identifier code. If the identifier code in the DRC control message 310 matches the unique code stored in a CAN node arrangement and/or vehicle ECU, then that arrangement interprets or processes the control command of the DRC control message 310. When the command is for initiating data retrieval, for example, the selected CAN node arrangement and/or vehicle ECU enters a data retrieval mode.

Next, the CAN gateway arrangement 130 communicates or transmits a DA address message 320, which includes the memory address(es) or address range of the data to be accessed, controlled and/or retrieved. A bit pattern in the DA address message 320 may be used to indicate that single words should be retrieved. The DA address message 320 may also include two addresses, in which case the selected CAN node arrangement and/or vehicle ECU may insert two words at the two specified addresses in the DR data and/or reply message 330, as discussed. But if, for example, the bit pattern indicates that an address range is to be accessed, controlled and/or retrieved and the DA address message 320 includes two addresses, then the selected CAN node arrangement and/or vehicle ECU inserts all words between the two addresses specified in the DA address message 320 in a set of multiplexed DR data and/or reply messages. Alternatively, the DA address message 320 may include the number of words to be retrieved, starting from the single memory address that is provided, as discussed above.

Next, the selected CAN node arrangement and/or vehicle ECU identified by the code replies to the DA address message 320 from the CAN gateway arrangement 130 with one or more DR data and/or reply messages 330 based on the number of words to be retrieved from the memory. The identifier(s) of the DR data and/or reply message(s) 330 are different from the identifiers of the DRC control (initialization/end) messages 310 and the DA address messages 320. The DR data and/or reply messages 330 may be communicated or transmitted periodically using the same identifier (and a multiplexed payload) or using changing identifiers (which may be done, for example, by incrementing the identifiers by a fixed number). The DR data and/or reply messages 330 may be communicated or transmitted periodically until a "stop data retrieval" command is communicated in a DRC end/stop control message 310b. The foregoing provides real-time or essentially real-time monitoring of internal states in a selected CAN node arrangement and/or vehicle ECU. For a memory dump or snapshot (that is, retrieving a set of words), the words to be retrieved from a selected memory of the selected CAN node arrangement and/or vehicle ECU may be distributed through multiplexing over a set of periodic DR data and/or reply messages 330. If the contents of the memory address range specified in the DA address message 320 have been communicated or transmitted, the method is repeated until the CAN gateway arrangement 130 communicates a "stop data retrieval" command in a DRC end/stop control message 310b to the selected CAN node arrangement and/or vehicle ECU, as controlled by the remote accessing and/or control arrangement 211.

When the CAN gateway arrangement 130 receives the DR data and/or reply message(s) 330, the CAN gateway arrangement 130 assigns a time stamp to each such message. Depending on the maximum or effective maximum data rate on the TCP/IP wireless link and the appropriate or desired access, control and/or retrieval methods (as described herein), the CAN gateway arrangement 130 inserts the data payload of the DR data and/or reply message(s) 330 in a TCP message frame as follows.

For monitoring and periodic single word access, control and/or retrieval, the DR data and/or reply message 330 may be embedded into a TCP information stream for each incoming DR data and/or reply message 330 and then communicated or transmitted without delay. Although not necessarily an optimally efficient mapping strategy in terms of overhead to data payload for the TCP link, it is believed to be useful for monitoring internal states of a selected CAN node arrangement and/or vehicle ECU in real-time or essentially real-time. The internal signals of the vehicle ECU are not otherwise communicated or transmitted by the ECU on the CAN bus arrangement 100. For multiple word retrieval (such as, for example, a memory dump), the data payload of the incoming DR data and/or reply messages 330 may be buffered, and the data payloads of a plurality of received DR data and/or reply messages 330 may be concatenated into the TCP information stream for maximizing or at least improving throughput on the TCP link. In an exemplary embodiment, the data payload of the DR data and/or reply message 330 (and not the entire DR data and/or reply message 330) may be incorporated in the TCP information stream so that it is not necessary to process or "wrap" the entire message. In this way, the payload is extracted so that the vehicle-specific CAN implementation may be "masked" with respect to the remote accessing and/or controlling arrangement 211.

Finally, to stop accessing, controlling and/or retrieving data at a selected CAN node arrangement and/or vehicle ECU, a DRC end/stop control message 310b may be communicated or transmitted by the CAN gateway node arrangement 130, and the control command in the DRC control message 310b is selected or set for, for example, to stop data retrieval.

Figure 3:
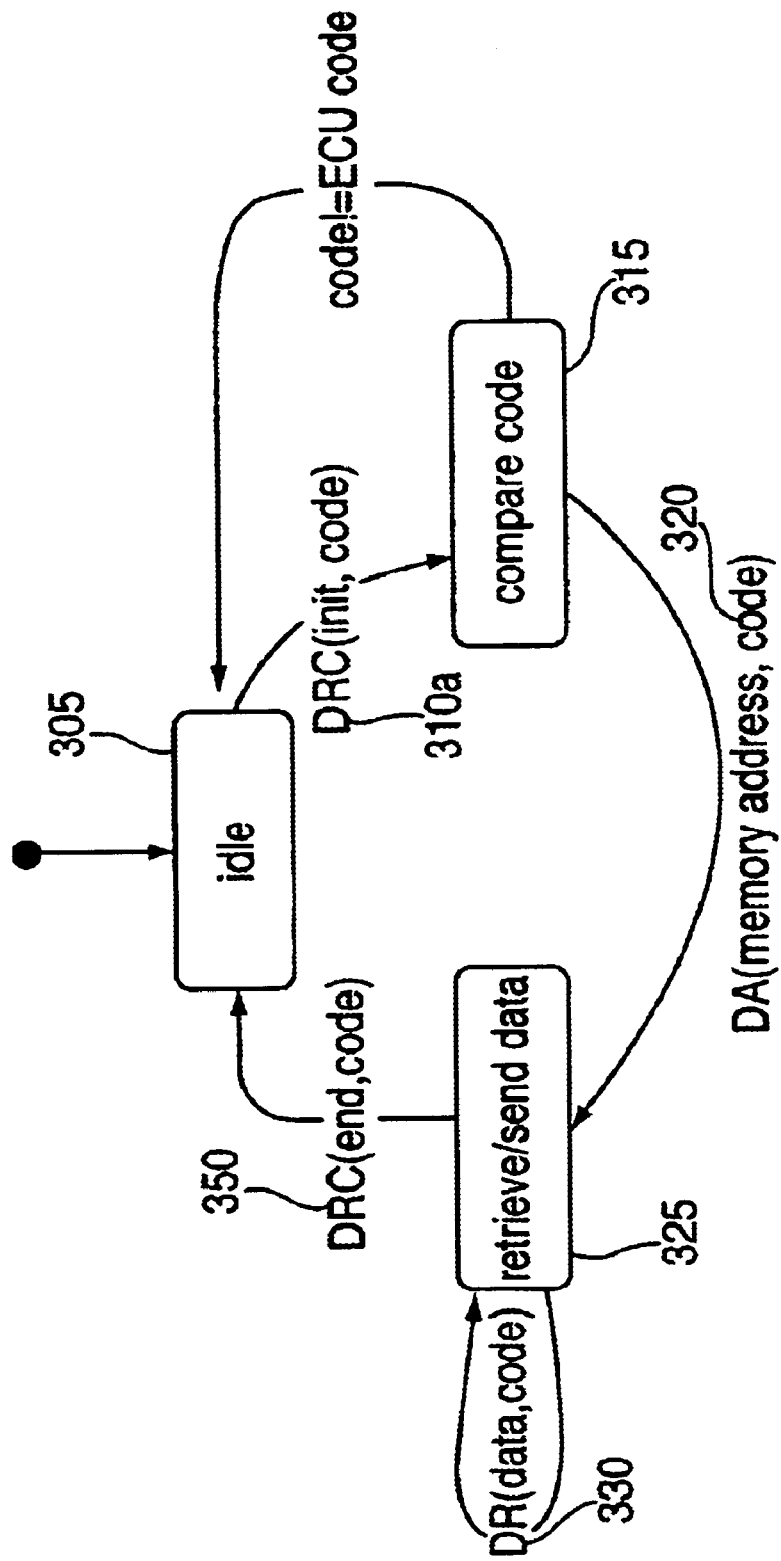
FIG. 3 shows an exemplary method for use by a CAN/TCP gateway arrangement for accessing, controlling and/or retrieving information of a selected CAN node arrangement and/or a vehicle ECU.

FIG. 3 shows an exemplary method for use by a CAN gateway arrangement for accessing, controlling and/or retrieving information associated with a CAN node arrangement, which may be a vehicle ECU. As shown, FIG. 3 includes "idle" or "wait" block 305, compare code block 315 and retrieve/send data block 325 for use with the DRC initialization control message 310a, the DA address message 320, the DR data and/or reply messages 330a, 330b, 330c, . . . , 330n and the DRC end control message 310b (or any other suitably appropriate DRC control messages 310c, 310d, 310e, . . . , 310n), which are implemented using the processor arrangement of the CAN gateway arrangement 130.

In particular, the exemplary method of FIG. 3 is for remotely accessing at least one of at least one CAN node arrangement of a CAN bus arrangement associated with the vehicle during vehicle operation, the CAN bus arrangement being associated with a CAN gateway arrangement for coupling to an external network, and includes the steps of: communicating an initialization control message from the CAN gateway arrangement to the at least one CAN node arrangement using the CAN bus arrangement, the initialization control message including a CAN node arrangement identifier code; comparing the CAN node arrangement identifier code with a unique CAN node arrangement identifier code stored at each of the at least one CAN node arrangement for determining a selected CAN node arrangement based on the CAN node arrangement identifier code and the unique CAN node arrangement identifier code; processing the initialization control message using the selected CAN node arrangement; communicating a data addressing message from the CAN gateway arrangement to the selected CAN node arrangement, the data addressing message including at least one memory address of the data to be at least one of accessed, controlled and retrieved; communicating at least one data reply message from the selected CAN node arrangement to the CAN gateway arrangement, wherein the at least one data reply message includes a data payload; incorporating at least the data payload of the at least one data reply message using a communication protocol of the external network for communication of the data payload to the remote accessing arrangement; and communicating an end control message from the CAN gateway arrangement to the selected CAN node arrangement using the CAN bus arrangement. As described herein, the data addressing message and a control message, such as the initialization control message 310a, may be included in one message.

The identifiers for the DRC control, DA address, and DR data and/or reply messages are assigned a lower priority relative to the priorities of identifiers of the "regular" CAN messages for the normal or extended CAN protocols. In addition, the debounce/time periods for event-triggered messages and the time periods for time-triggered messages should be selected to minimize or at least reduce any negative influence on the delays or latencies of the regular CAN messages. Additionally, the CAN gateway arrangement 130 may essentially communicate simultaneously with a plurality of CAN node arrangements and/or vehicle ECUs since the node arrangements are each identifiable by their unique codes. The identifiers of the DR data and/or reply messages 330 from different CAN node arrangements and/or vehicle ECUs should be different to ensure that CAN arbitration works properly.

Besides DRC initialization/start control message 310a, DRC end/stop control message 310b and DA address messages 320, other DRC control messages 310c, 310d, . . . , 310n may be communicated by the remote accessing and/or control arrangement 211 for enabling a remote user to control various vehicle subsystems through the remotely accessed CAN node arrangements and/or vehicle ECUs. To avoid a "bubbling" node (that is, an undefined node problem), the set of messages that may be communicated, the message period/time and the debounce period/time may be predefined. Also, the remote accessing and/or control arrangement 211 may not alter the identifier of the messages communicated or transmitted by the CAN gateway arrangement 130, since the remote accessing and/or control arrangement 211 may only select predefined messages stored in the CAN gateway arrangement 130.

Finally, other suitably appropriate communication protocols, including the universal data protocol (UDP), RS-232 serial and/or other protocols, which may operate together with the wireless or cellular phone protocol, may also be used.

Thus, the foregoing describes an exemplary apparatus, method and system for remotely accessing, controlling and/or retrieving internal states and/or memory content of a selected CAN node arrangement and/or vehicle ECU, while the vehicle is operating in the field. Usefully, the vehicle may be globally accessed using a unique number assigned to a cellular phone or satellite phone or other wireless communication arrangement. Moreover, the present apparatus, method and system are believed to better facilitate field testing, engineering feedback, failure troubleshooting, and remotely communicating control signals to a selected CAN node arrangement and/or vehicle ECU for controlling the selected arrangement from the remote accessing and/or control arrangement 211, such as a remote computer or other remote access/control device.

What is claimed is:

1. A method for remotely accessing at least one CAN node arrangement of a CAN bus arrangement associated with a vehicle during vehicle operation, the CAN bus arrangement being associated with a CAN gateway arrangement for coupling to an external network, the method comprising the steps of:

communicating an initialization control message from the CAN gateway arrangement to the at least one CAN node arrangement using the CAN bus arrangement, the initialization control message including a CAN node arrangement identifier code;

comparing the CAN node arrangement identifier code with a unique CAN node arrangement identifier code stored at each of the at least one CAN node arrangement for determining a selected CAN node arrangement based on the CAN node arrangement identifier code and the unique CAN node arrangement identifier code;

processing the initialization control message using the selected CAN node arrangement;

communicating a data addressing message from the CAN gateway arrangement to the selected CAN node arrangement, the data addressing message including at least one memory address of the data to be at least one of accessed, controlled and retrieved;

communicating at least one data reply message from the selected CAN node arrangement to the CAN gateway arrangement, wherein the at least one data reply message includes a data payload;

incorporating at least the data payload of the at least one data reply message using a communication protocol of the external network for communication of the data payload to the remote accessing arrangement; and communicating an end control message from the CAN gateway arrangement to the selected CAN node arrangement using the CAN bus arrangement.

2. The method of claim 1, further comprising the step of establishing a wireless communication link between a remote accessing and control arrangement and the CAN gateway arrangement.

3. The method of claim 2, wherein the step of establishing the wireless communication is performed using a data call based on a point-to-point protocol.

4. The method of claim 2, wherein the remote accessing and control arrangement includes a computer arrangement.

5. The method of claim 2, wherein the remote accessing and control arrangement includes a wireless communication arrangement.

6. The method of claim 2, wherein the remote accessing and control arrangement includes a computer arrangement and a wireless communication arrangement.

7. The method of claim 1, wherein the external network includes the Internet.

8. The method of claim 2, wherein:
the communication protocol includes at least one of a transmission control protocol and an Internet protocol; and
the remote accessing and control arrangement and the CAN gateway node arrangement are identified by associated addresses based on the Internet protocol.

9. The method of claim 1, wherein the CAN gateway arrangement includes:
a processor arrangement for communicating with the CAN node arrangement using the CAN bus arrangement; and
a wireless communication arrangement for communications with a remote accessing and control arrangement.

10. The method of claim 1, wherein the CAN bus arrangement includes:
at least two CAN buses; and
at least one CAN/CAN gateway arrangement for coupling the at least two CAN buses.

11. The method of claim 1, wherein the at least one CAN node arrangement includes at least one of an electronic control unit, a sensor arrangement and a control module for use in the vehicle.

12. The method of claim 1, wherein the initialization control message includes a data defining payload for defining the data to be one of accessed, controlled and retrieved from the selected CAN node arrangement.

13. The method of claim 2, wherein:
the remote accessing and control arrangement communicates control information using a transmission control protocol; and
the control information corresponds to at least the initialization control message, the data addressing message, the data reply message and the end control message for causing the CAN gateway arrangement to communicate at least the initialization control message, the data addressing message, the data reply message and the end control message on the CAN bus arrangement.

14. The method of claim 2, wherein the CAN node arrangement identifier code for determining the selected CAN node arrangement is determined by a program of the remote accessing and control arrangement.

15. The method of claim 1, wherein the CAN gateway arrangement stores a set of CAN gateway message identifiers for providing CAN gateway communications on the CAN bus arrangement.

16. The method of claim 1, wherein the CAN gateway arrangement stores at least one of a message time period and a debounce time period.

17. The method of claim 1, wherein the CAN gateway arrangement stores unique CAN node arrangement identifier codes for each of the at least one CAN node arrangement.

18. The method of claim 17, wherein:
the unique CAN node arrangement identifier codes differ from corresponding addresses used by a program of a remote accessing and control arrangement; and
the CAN gateway arrangement includes a lookup table for matching each of the unique CAN node arrangement identifier codes and the corresponding addresses from the remote accessing and control arrangement.

19. The method of claim 1, wherein the data addressing message includes information for at least one of accessing, controlling and retrieving at least one of a single word, two words and a plurality of words within an address range.

20. The method of claim 19, wherein the plurality of words within the address range are communicated in a set of multiplexed data reply messages.

21. The method of claim 1, wherein at least one of a selected electronic control unit and the selected CAN node arrangement replies to the data addressing message with the at least one data reply message.

22. The method of claim 21, wherein:
data reply message identifiers differ from initialization control message identifiers and data addressing message identifiers; and
the data reply messages are communicated periodically by one of using a same data reply message identifier for a multiplexed payload and using a changing data reply message identifier.

23. The method of claim 1, wherein:
at least one of a selected electronic control unit and the selected CAN node arrangement is monitored essentially in real-time by periodically retrieving at least one word; and
payload information of each of the data reply messages is transmitted by the CAN gateway arrangement without delay on the external network.

24. The method of claim 23, wherein the payload information includes internal signal information from a memory of the selected electronic control unit.

25. The method of claim 1, wherein at least one of multiple word retrieval and a memory dump is provided by buffering payload information of the data reply messages and concatenated into a transmission communication protocol information stream.

26. The method of claim 1, wherein the data addressing message and a control message are included in one message for communication on the CAN bus arrangement.

27. The method of claim 1, wherein the initialization control message further includes:
a command specifying one of a class and a type of data to be retrieved; and
at least one bit for implementing at least one of an initiate data retrieval state and a stop data retrieval state.

28. The method of claim 1, wherein the initialization control message further includes at least one bit adapted to provide one of access to and control over the at least one CAN node arrangement.

29. The method of claim 1, wherein the initialization control message further includes:
a first byte identifying the at least one CAN node arrangement; and
a second byte including one of a data access command, a data control command, and a data retrieval command.

30. The method of claim 1, wherein the data addressing message further includes a byte containing a number of words to be retrieved after a word location provided by the initialization control message.

31. The method of claim 1, wherein the initialization control message further includes the data addressing message.

32. The method of claim 1, wherein the at least one data reply message further includes a first byte including the CAN node arrangement identifier code.

33. The method of claim 32, wherein data payload includes a requested word payload occupying seven bytes following the first byte.

34. A system for remotely accessing at least one CAN node arrangement during vehicle operation, the system comprising:
a CAN bus arrangement for use in a vehicle, the at least one CAN bus including the at least one CAN node arrangement;

a wireless communication arrangement for coupling with an external network;

a CAN gateway arrangement for coupling with the remote network arrangement, the CAN gateway arrangement being coupled to the wireless communication arrangement;

another wireless communication arrangement; and a remote accessing and control arrangement for at least one of remotely accessing and remotely controlling at least one of the at least one CAN node arrangement through the CAN bus arrangement, the remote accessing and control arrangement being coupled to the another wireless arrangement and being configured for communicating between the another wireless communication arrangement and the wireless communication arrangement of the CAN gateway arrangement.

35. The system of claim 34, wherein the CAN gateway arrangement includes a processor for performing the following steps:

communicating an initialization control message from the CAN gateway arrangement to the at least one CAN node arrangement using the CAN bus arrangement, the initialization control message including a CAN node arrangement identifier code;

comparing the CAN node arrangement identifier code with a unique CAN node arrangement identifier code stored at each of the at least one CAN node arrangement for determining a selected CAN node arrangement based on the CAN node arrangement identifier code and the unique CAN node arrangement identifier code;

processing the initialization control message using the selected CAN node arrangement;

communicating a data addressing message from the CAN gateway arrangement to the selected CAN node arrangement, the data addressing message including at least one memory address of the data to be at least one of accessed, controlled and retrieved;

communicating at least one data reply message from the selected CAN node arrangement to the CAN gateway arrangement, wherein the at least one data reply message includes a data payload;

incorporating at least the data payload of the at least one data reply message using a communication protocol of the external network for communication of the data payload to the remote accessing arrangement; and communicating an end control message from the CAN gateway arrangement to the selected CAN node arrangement using the CAN bus arrangement.

36. The system of claim 35, wherein the data addressing message and a control message are included in one message for communication on the CAN bus arrangement.

37. A CAN gateway arrangement for accessing at least one CAN node arrangement of a CAN bus arrangement associated with the vehicle during vehicle operation, the CAN bus arrangement being linkable to the CAN gateway arrangement for coupling to an external network, the CAN gateway arrangement comprising:

a processor arrangement for performing the following steps:

communicating an initialization control message from the CAN gateway arrangement to the at least one CAN node arrangement using the CAN bus arrangement, the initialization control message including a CAN node arrangement identifier code;

comparing the CAN node arrangement identifier code with a unique CAN node arrangement identifier code stored at each of the at least one CAN node arrangement for determining a selected CAN node arrangement based on the CAN node arrangement identifier code and the unique CAN node arrangement identifier code;

processing the initialization control message using the selected CAN node arrangement;

communicating a data addressing message from the CAN gateway arrangement to the selected CAN node arrangement, the data addressing message including at least one memory address of the data to be at least one of accessed, controlled and retrieved;

communicating at least one data reply message from the selected CAN node arrangement to the CAN gateway arrangement, wherein the at least one data reply message includes a data payload;

incorporating at least the data payload of the at least one data reply message using a communication protocol of the external network for communication of the data payload to the remote accessing arrangement; and communicating an end control message from the CAN gateway arrangement to the selected CAN node arrangement using the CAN bus arrangement.

38. The CAN gateway arrangement of claim 37, further comprising a wireless communications arrangement for communicating with the external network.

39. The CAN gateway arrangement of claim 38, wherein the wireless communications arrangement includes at least one of a modem and a cellular phone.

40. The CAN gateway arrangement of claim 37, wherein the data addressing message and a control message are included in one message for communication on the CAN bus arrangement.

* * * * *